US009778092B2

(12) United States Patent
Kawanishi et al.

(10) Patent No.: US 9,778,092 B2
(45) Date of Patent: Oct. 3, 2017

(54) PACKER SCALE HAVING A HOPPER BODY SUSPENDED BY SUSPENDING UNITS

(71) Applicant: YAMATO SCALE CO., LTD., Hyogo (JP)

(72) Inventors: Shozo Kawanishi, Hyogo (JP); Akinari Okunosono, Hyogo (JP); Masatomi Tsuruoka, Hyogo (JP)

(73) Assignee: YAMATO SCALE CO., LTD., Akashi-shi, Hyogo (JP)

( * ) Notice: Subject to any disclaimer, the term of this patent is extended or adjusted under 35 U.S.C. 154(b) by 98 days.

(21) Appl. No.: 14/647,421

(22) PCT Filed: Nov. 27, 2012

(86) PCT No.: PCT/JP2012/007589
§ 371 (c)(1),
(2) Date: May 26, 2015

(87) PCT Pub. No.: WO2014/083588
PCT Pub. Date: Jun. 5, 2014

(65) Prior Publication Data

US 2015/0308884 A1 Oct. 29, 2015

(51) Int. Cl.
*G01G 13/06* (2006.01)
*G01G 13/18* (2006.01)
(Continued)

(52) U.S. Cl.
CPC ............ *G01G 13/18* (2013.01); *G01G 13/00* (2013.01); *G01G 19/14* (2013.01); *G01G 19/18* (2013.01); *G01G 21/06* (2013.01); *G01G 21/23* (2013.01)

(58) Field of Classification Search
CPC ........ G01G 13/00; G01G 13/18; G01G 19/14; G01G 19/18; G01G 21/10; G01G 21/02–21/085
(Continued)

(56) References Cited

U.S. PATENT DOCUMENTS 3,472,329 A * 10/1969 Smith .................. G01G 3/1408 177/132
3,512,595 A * 5/1970 Laimins .................. G01G 1/24 177/187
(Continued)

FOREIGN PATENT DOCUMENTS

JP HU01-81535 5/1989
JP 2-32220 2/1990
(Continued)

OTHER PUBLICATIONS

Computer translation of JP 2012-230065, JPO webpage, May 16, 2017.*
Search Report for PCT/JP2012/007589, mailed Dec. 25, 2012.

*Primary Examiner* — Randy Gibson
(74) *Attorney, Agent, or Firm* — Marshall, Gerstein & Borun LLP

(57) ABSTRACT

A packer scale comprises a weighing hopper which is supplied with objects dropped from above, holds the objects for a specified period and discharges the objects downward; first to fourth load cells having shaft-like load application sections, respectively; and first to fourth suspending units which suspend the weighing hopper such that the weighing hopper is mounted to the load application sections of the first to fourth load cells; the weighing hopper includes a hopper body having a tubular shape with a rectangular cross-section, in a plan view; and the first to fourth suspending
(Continued)

units are mounted to an upper portion of the hopper body, in locations which are in the vicinity of corner portions of the tubular shape.

12 Claims, 13 Drawing Sheets

(51) Int. Cl.

| | |
|---|---|
| ***G01G 19/18*** | (2006.01) |
| ***G01G 21/06*** | (2006.01) |
| ***G01G 21/23*** | (2006.01) |
| ***G01G 13/00*** | (2006.01) |
| ***G01G 19/14*** | (2006.01) |

(58) Field of Classification Search
USPC ...................................................... 177/DIG. 9
See application file for complete search history.

(56) References Cited

U.S. PATENT DOCUMENTS 3,980,148 A * 9/1976 Von Drygalski ..... G01G 19/021 177/132
4,004,647 A * 1/1977 Forst ......................... B60P 3/10 177/128
4,085,850 A * 4/1978 Heltzel .................. G01G 21/10 177/255
4,478,301 A * 10/1984 Cochran, Jr. .......... G01G 13/18 177/105
4,627,507 A * 12/1986 Powell ..................... G01G 3/12 177/211
4,638,875 A * 1/1987 Murray .................. G01G 17/02 177/1
5,143,165 A * 9/1992 Hough ................... G01G 13/18 141/83
5,174,404 A * 12/1992 Nuyts .................... G01G 19/08 177/255
5,801,339 A * 9/1998 Boult ..................... G01G 17/08 177/261
7,475,793 B2 * 1/2009 Wahl ................... B65B 69/0091 222/77
2014/0014414 A1 * 1/2014 Kawanishi ............. G01G 13/06 177/15

FOREIGN PATENT DOCUMENTS

JP 11-159191 6/1999
JP 3857966 B2 12/2006
JP 2009-65043 3/2009
JP 2012-230065 11/2012
JP 2012-230065 A * 11/2012 ............. G01G 13/00

* cited by examiner

PACKER SCALE HAVING A HOPPER BODY SUSPENDED BY SUSPENDING UNITS

TECHNICAL FIELD

The present invention relates to a packer scale which adjusts the weight of objects such as powdered products (detergent, fertilizer, etc.), granular products (resin pellets, cereal, feeding stuff, etc.), or liquid so that the objects have a predetermined target weight, and charges the objects of the target weight into containers such as bags.

BACKGROUND ART

A packer scale which efficiently lumps together resin pellets which are raw materials for a resin molding process such that the resin pellets have a target weight and charges the resin pellets of the target weight into bags, is provided with a weighing hopper (scale hopper) which is supplied with the objects from above, weighs the objects and discharges downward the weighed objects. To weigh the objects held inside each weighing hopper, together with the weighing hopper, the weighing hopper is required to be allowed to move vertically to some extent, with respect to a weighing device body, during the operation of a weighing device. To this end, in general, the weighing hopper is suspended from a load cell mounted to the weighing device body, by using a suspending unit (see, e.g., Patent Literature 1).

In this case, in the packer scale which charges the objects into the containers such as the bags, in order to stably retain the weighing hopper and to suppress non-uniformity of a weighing accuracy, a three-point support structure is formed, in which the weighing hopper is suspended from and mounted to three load cells at three points (see, e.g., Patent Literature 2).

CITATION LIST

Patent Literature

Patent Literature 1: Japanese Patent Publication No. 3857966

Patent Literature 2: Japanese Laid-Open Patent Application Publication No. Hei 2-32220

SUMMARY OF INVENTION

Technical Problem

However, in a case where the three-point support structure is applied to the weighing hopper which has a rectangular shape in a plan view, the following problem exists. When the weighing hopper having a rectangular shape is suspended at three points, the center of gravity of the weighing hopper lies on the center of gravity of a triangular shape having three apexes. Note that the objects thrown into the weighing hopper are not always dropped to the location of the center of gravity of the weighing hopper. If the objects thrown into the weighing hopper are dropped to a region outside the triangular shape, the weighing hopper swings greatly, and cannot be stabilized. As described above, the weighing hopper is suspended from and mounted to the load cells, and there is a difference in a vertical direction between the positions at which the weighing hopper is suspended and mounted to the load cells and the location of the center of gravity of the weighing hopper (height of center of gravity occurs). Therefore, depending on the degree of the height of center of gravity, the effects caused by an uneven load may be significant.

The present invention has been developed under the above stated circumstances, and an object of the present invention is to provide a packer scale which is capable of performing weighing stably and in a shorter time while lessening to a minimum level the effects of the unevenness of the objects thrown into the weighing hopper and the height of center of gravity of the objects held inside the weighing hopper.

Solution to Problem

To solve the above described problem, according to the present invention, there is provided a packer scale for charging objects with a predetermined weight into each bag, the packer scale comprising: a weighing hopper which is supplied with the objects dropped from above, holds the objects for a specified period and discharges the objects downward; first to fourth load cells having shaft-like load application sections, respectively; and first to fourth suspending units which suspend the weighing hopper such that the weighing hopper is mounted to the load application sections of the first to fourth load cells; the weighing hopper includes a hopper body having a tubular shape with a rectangular cross-section, in a plan view; and the first to fourth suspending units are mounted to an upper portion of the hopper body, in locations which are in the vicinity of corner portions of the tubular shape.

In accordance with this configuration, the weighing hopper includes the hopper body having a tubular shape with a rectangular cross-section in a plan view, and the first to fourth suspending units are mounted to the upper portion of the hopper body, in locations which are in the vicinity of the corner portions of the tubular shape. In other words, the weighing hopper is suspended from and supported by the four suspending units. In this configuration, the moment of each suspending unit is larger than the moment of the suspending unit in the conventional three-point support structure which suspends the weighing hopper at three points. In other words, it becomes possible to increase the force for returning the weighing hopper to a horizontal position when the weighing hopper is inclined from the horizontal position due to an uneven load. Therefore, the structure of the present invention can realize a more stable state than the conventional structure, when the objects thrown into the weighing hopper become uneven.

Each of the suspending units includes a first member mounted to the load application section of the load cell; and a second member fastened to the weighing hopper; the first member may have a first hole extending in a predetermined first axis direction and a second hole extending in a second axis direction which three-dimensionally crosses the first axis; the first member may be mounted to the load application section of the load cell via a first ball bearing fitted to the first hole such that the first member is rotatable relative to the load application section; and the second member may be mounted to the first member via a second ball bearing fitted to the second hole of the first member such that the second member is rotatable relative to the first member.

In accordance with this configuration, the first member of the suspending unit is mounted to the load application section of the load cell via the first ball bearing such that the first member is rotatable relative to the load application section around the shaft (around the first axis) of the load application section. In addition, the second member fastened to the weighing hopper is mounted to the first member such that the second member is rotatable relative to the first member around the second axis which three-dimensionally crosses the first axis. In this structure, when the objects are thrown into the weighing hopper, the first member and the second member are pivoted around the two axes, respectively, such that the impact is absorbed, thereby allowing the weighing hopper to be displaced horizontally and vertically. In addition, the pivot motion caused by the impact is quickly diminished by the weight of the weighing hopper and the weight of the objects, and the ball bearings with a low friction allow the first member and the second member to quickly return to positions at which the weighing hopper is in a lowest position. Furthermore, because of the absence of the hook member which is used in the conventional example, the jump motion of the weighing hopper and the second member, relative to the load cell and the first member, due to the impact generated when the objects are thrown into the weighing hopper, will not occur, and the first member mounted to the load application section of the load cell is not displaced from a proper position. This allows the impact applied to the weighing hopper to be efficiently released and the weighing hopper to be stabilized in a shorter time. As a result, weighing can be carried out with a higher weighing accuracy and in a shorter time.

The second axis may be an axis included in both of a first virtual plane perpendicular to the first axis and a second virtual plane parallel to the first axis.

A center-to-center distance between the first ball bearing and the second ball bearing may be set greater than a sum of a radius of the first ball bearing and a radius of the second ball bearing and equal to or less than 1.5 times as large as the sum. This makes it possible to reduce the amount of the pivot motion of the first member due to the impact and stabilize the weighing hopper in a shorter time.

The first member may have a first surface perpendicular to the first axis and a second surface perpendicular to the second axis. With this structure, the mounting surface by which the first member is mounted to the load cell and the mounting surface by which the second member is mounted to the first member are flat surfaces. As a result, space saving can be achieved, and the first member is easily rotatable (pivotable) relative to the load call and the second member is easily rotatable (pivotable) relative to the first member.

The second member may include a mounting surface parallel to the second surface; and a rotary shaft mounted to the mounting surface such that the rotary shaft extends in a direction perpendicular to the mounting surface. This makes it possible to easily mount the second member to the first member, while achieving space saving.

The above and further objects, features and advantages of the invention will more fully be apparent from the following detailed description with accompanying drawings.

Advantageous Effects of Invention

The present invention has been described above, and can achieve advantages that weighing can be performed stably and in a shorter time while lessening to a minimum level the effects of the unevenness of the objects thrown into the weighing hopper and the height of center of gravity of the objects held inside the weighing hopper.

DESCRIPTION OF EMBODIMENTS

Figure 1:
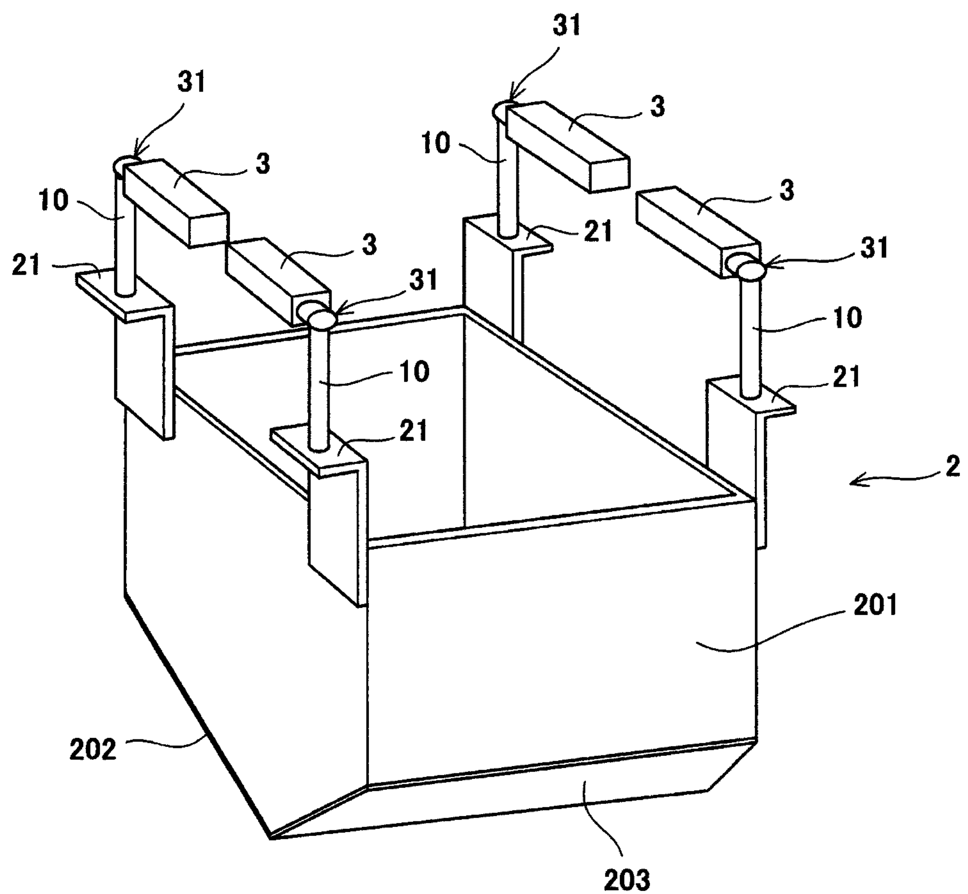
FIG. 1 is a perspective view showing the schematic structure of a packer scale according to Embodiment 1 of the present invention.

Hereinafter, the specific exemplary configuration of a packer scale according to an embodiment of the present invention will be described with reference to the drawings. Hereinafter, throughout the drawings, the same or corresponding components are identified by the same reference symbols and will not be described in repetition in some cases. The specific description below is merely intended to recite features of the packer scale. For example, when wordings which are the same as those which identify the packer scale or corresponding wordings are designated by reference symbols to specifically describe a specific example below, specific components are an example of the corresponding components of the packer scale. Therefore, the features of the packer scale are in no way intended to be limited by description provided below.

Outline of the Present Invention

The present invention provides a structure in which in a packer scale which adjusts the weight of objects so that the objects have a predetermined target weight, and charges the objects of the target weight into containers such as bags, a weighing hopper having a tubular shape with a rectangular cross-section, is suspended from the corresponding four load cells by mounting four suspending units to the weighing hopper, in locations which are in the vicinity of the corner portions of the tubular shape. As described previously, the conventional packer scale employs the three-point support structure which is physically stable, even when the weighing hopper has a tubular shape with a rectangular cross-section, in a plan view. In general, the packer scale has a smaller size and a smaller scale amount (target weight) than a hopper scale. Therefore, the packer scale is required to have a relatively high weighing accuracy. For this reason, the conventional packer scale employs the three-point support structure which makes it easier to retain the weighing hopper horizontally stably while reducing the load cells in number to enhance the resolution of the weighing hopper.

The hopper scale is configured to receive raw materials, as the objects, which are bulk solids such as granular products or liquid, discharge the raw materials, or blend the raw materials. Frequently, the hopper scale employs a larger scale amount than the packer scale. Typically, the hopper scale is not required to have a high ability (weighing speed and weighing accuracy). In contrast, the packer scale is required to always increase a charging speed at which the objects are charged into bags, or lessen the non-uniformity of the weight of the objects charged into the bags. Therefore, the packer scale is required to increase a weighing speed or a weighing accuracy.

However, if the speed at which the objects are thrown into the weighing hopper is increased to increase the charging speed, the objects thrown into the weighing hopper tends to become uneven. In addition, in the structure for supporting the weighing hopper at three points, when the objects thrown into the weighing hopper become uneven, a balance tends to be lost.

In view of the above stated circumstances, the inventors of the present invention studied intensively, and found out that by employing the four-point support structure which is not commonly employed in the packer scale, the effects of the unevenness of the objects thrown into the weighing hopper and the height of center of gravity of the objects held inside the weighing hopper are lessened to a minimum level, and thus the packer scale is able to perform weighing stably and in a shorter time. The present invention is made based on this finding.

Figure 14:
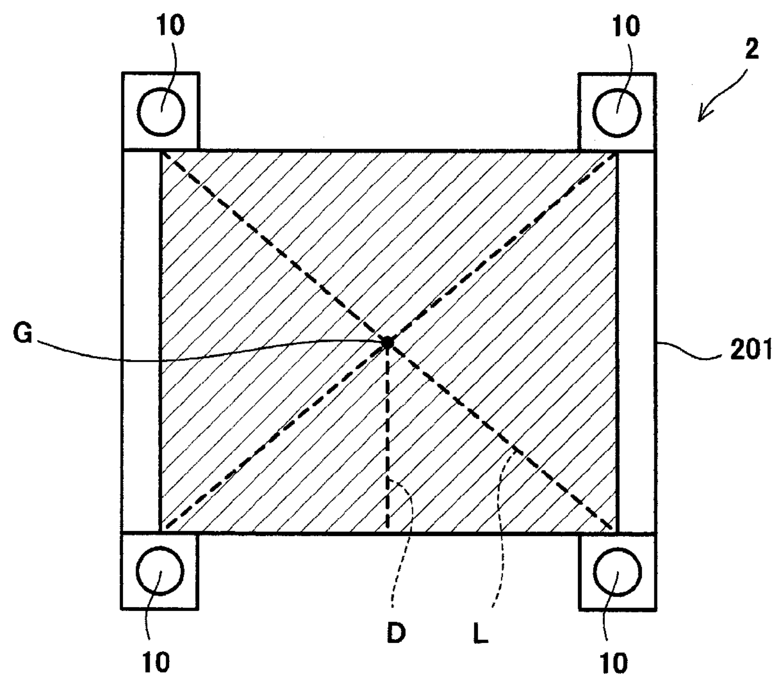
FIG. 14 is a conceptual view for explaining the advantages of a four-point support structure of the present invention.
Figure 15:
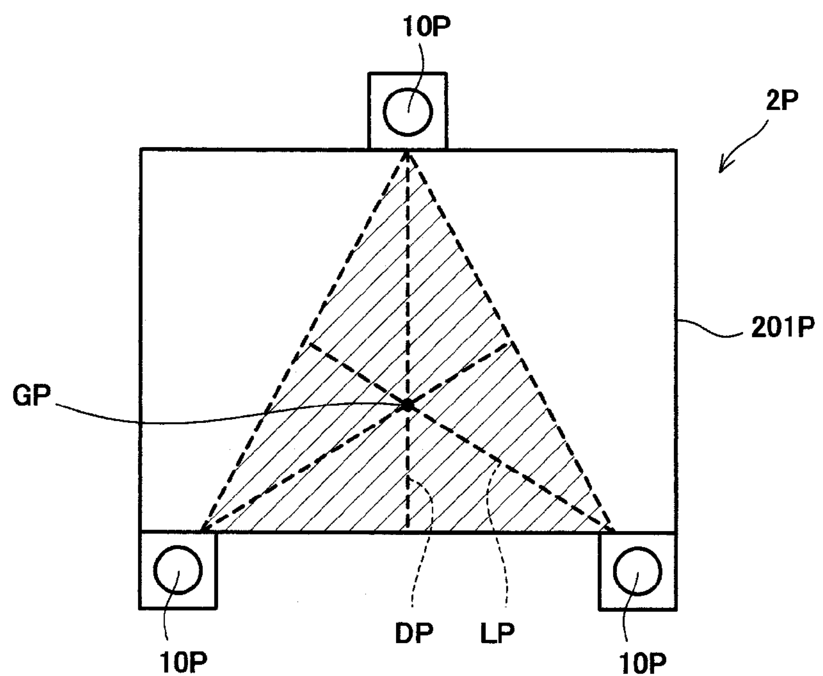
FIG. 15 is a conceptual view for explaining the problem associated with a conventional three-point support structure.

The four-point support structure of the present invention and the conventional three-point support structure will be described with reference to FIGS. 14 and 15, respectively. FIGS. 14 and 15 are conceptual views of a weighing hopper 2 and a weighing hopper 2P, respectively, when viewed from above. It is supposed that for the purpose of comparison, the weighing hopper 2 of FIG. 14 and the weighing hopper 2P of FIG. 15 have an equal size (equal capacity). As shown in FIG. 14, the weighing hopper 2 according to the embodiment of the present invention is attached with first to fourth suspending units 10 on the upper portion of a hopper body 201 having a tubular shape with a rectangular section, in a plan view, in locations which are in the vicinity of the corner portions thereof. In contrast, as shown in FIG. 15, the conventional weighing hopper 2P is attached with first to third suspending units 10P on the upper portion of a hopper body 201P having a tubular shape with a rectangular section, in a plan view, and in locations which are both ends of one of four sides of the tubular shape and the center portion of another side which is opposite to the one of the four sides.

In the case of the four-point support structure of FIG. 14, the center of gravity of the weighing hopper 2 is the center of gravity G (intersection of diagonal lines) of a rectangular shape having apexes which are the four suspending units 10. In the case of the three-point support structure of FIG. 15, the center of gravity of the weighing hopper 2P is the center of gravity GP (intersection of median lines) of a triangular shape having apexes which are the three suspending units 10P. Therefore, the distance D from the center of gravity G to each side of the rectangular shape in the four-point support structure is longer than the distance DP from the center of gravity GP to each side of the triangular shape in the three-point support structure. Therefore, the distance L between the center of gravity G and each suspending unit 10 in the four-point structure is also longer than the distance LP between the center of gravity GP and each suspending unit 10P in the three-point structure. As a result, if the distance (height of center of gravity) from the position at which the suspending unit 1 is attached to the weighing hopper 2 to the center of gravity is equal, the moment of the suspending unit 10 of the weighing hopper 2 in the four-point support structure is larger than the moment of the suspending unit 10P of the weighing hopper 2P in the three-point support structure. In other words, by employing the four-point support structure, it becomes possible to increase the force for returning the weighing hopper to a horizontal position without changing the height of center of gravity, when the weighing hopper is inclined from the horizontal position due to an uneven load. From this, it may be said that the weighing hopper 2 of the four-point support structure can realize a more stable state than the weighing hopper 2P of the three-point support structure, when the objects thrown into the weighing hopper become uneven.

If an uneven load is generated in a region outside the rectangular shape (indicated by hatched region in FIG. 14) having the apexes which are the suspending units 10, of the rectangular shape (throw-in surface of objects) of the tubular shape of the hopper body 201, this is deviated greatly from the center of gravity G of the weighing hopper 2, and thereby the weighing hopper 2 is likely to swing greatly. Or, if an uneven load is generated in a region outside the triangular shape (indicated by hatched region in FIG. 15) having the apexes which are the suspending units 10P, of the rectangular shape (throw-in surface of objects) of the tubular shape of the hopper body 201P, this is deviated from the center of gravity GP of the weighing hopper 2P, and thereby the weighing hopper 2P is likely to swing greatly. In the rectangular shapes of the tubular shapes of the hopper bodies 201, 201P of an equal size in the examples of FIGS. 14 and 15, the area of the region which is outside the triangular shape having the apexes which are the suspending units 10P, in the example of FIG. 15 (i.e., three-point support structure), is larger than the area of the region which is outside the rectangular shape having the apexes which are the suspending units 10, in the example of FIG. 14. From this, it may also be said that the weighing hopper 2 of the four-point support structure can realize a more stable state than the weighing hopper 2P of the three-point support structure, when the objects thrown into the weighing hopper become uneven.

In the case of the four-point support structure, the four load cells (reference symbol 3 of FIG. 1 as will be described later) weigh the weighing hopper 2 and the objects held inside thereof. Therefore, the load cells in the four-point support structure are allowed to have a smaller capacity than the load cells in the three-point support structure in which the weighing hopper is weighed by the three load cells. In addition, the four-point support structure can reduce time that passes from when the objects are thrown into the weighing hopper until a stabilized state is formed, in which the objects can be weighed (increase a character frequency of each load cell), and can improve a weighing accuracy, as compared to the three-point support structure.

Hereinafter, the configuration of the present invention will be described more specifically.

Embodiment 1

Initially, the packer scale of Embodiment 1 of FIGS. 1 to 4 will be described. The packer scale of the present embodiment includes a weighing hopper 2 which is supplied with objects dropped from above, holds the objects for a specified period and discharges the objects downward, first to fourth load cells 3 having shaft-like load application sections 31, respectively, and first to fourth suspending units 10 which suspend the weighing hopper 2 such that the weighing hopper 2 is mounted to the load application sections 31 of the first to fourth load cells 3. In addition, the packer scale includes a control device (not shown) such as a microcontroller and serves as a weight calculating means which calculates the weight of the objects held inside the weighing hopper 2 in response to the signals output from the first to fourth load cells 3.

Figure 2:
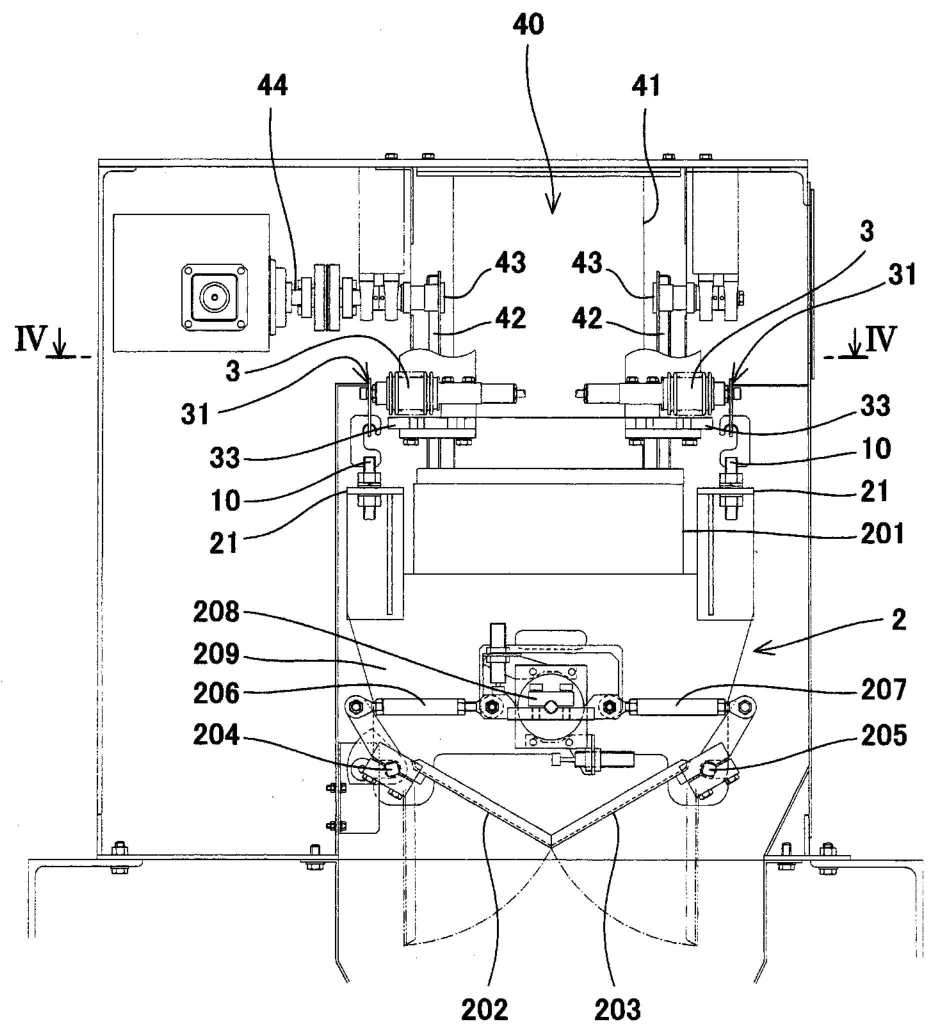
FIG. 2 is a front view showing the packer scale according to Embodiment 1 of the present invention.
Figure 3:
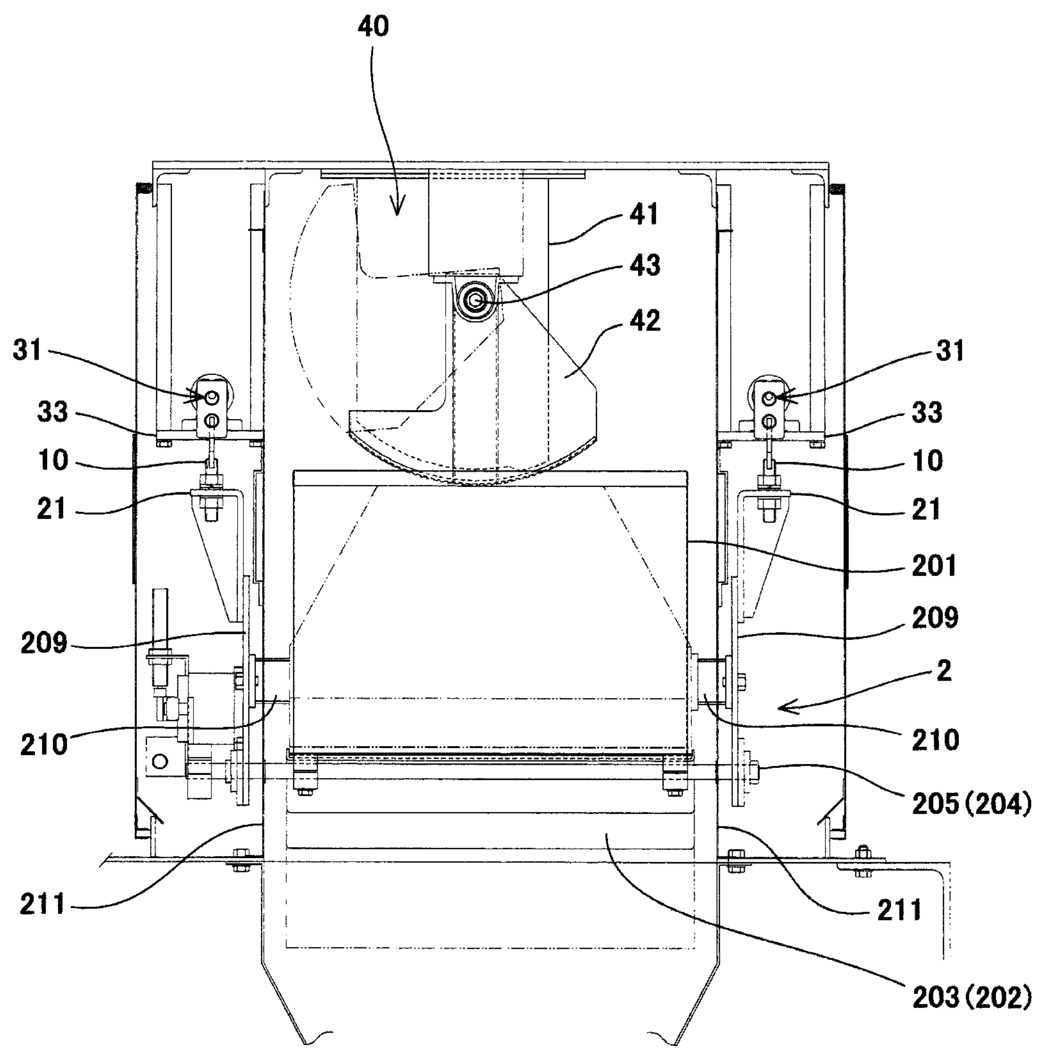
FIG. 3 is a side view of the packer scale of FIG. 2.
Figure 4:
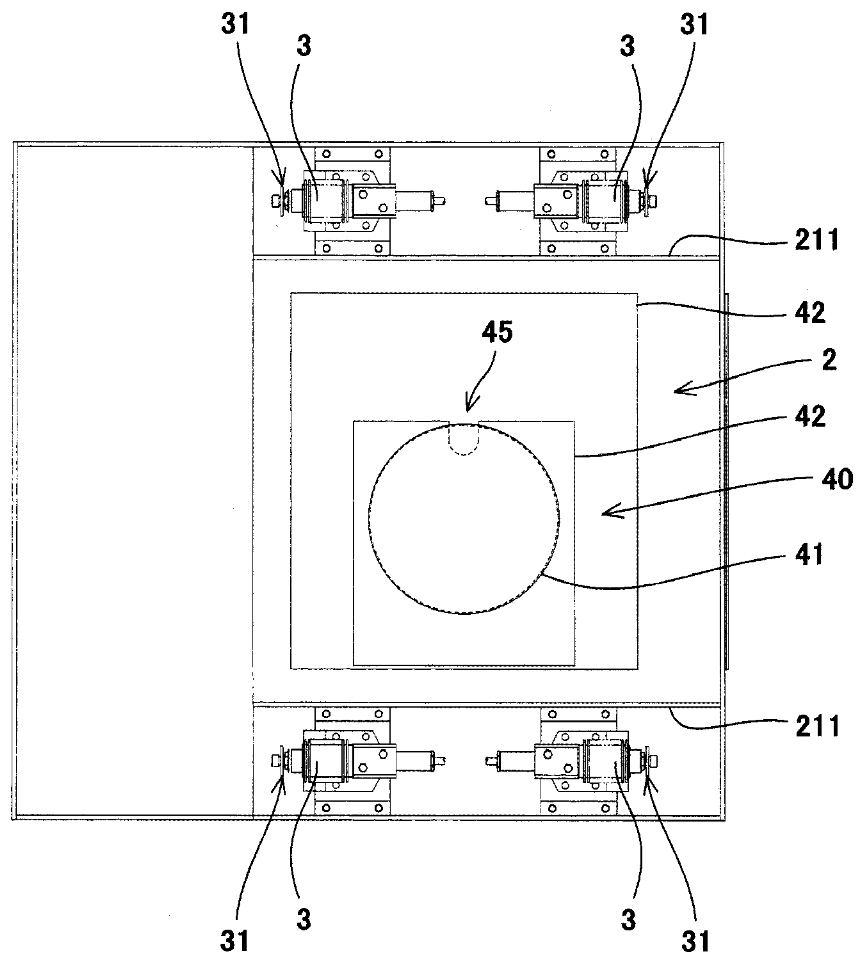
FIG. 4 is a top view (cross-sectional view taken in the direction of arrows along IV-IV of FIG. 2) of the packer scale of FIG. 2.

Although in the example of FIGS. 2 and 3, the two load cells 3 located in front of the weighing hopper 2 are shown, the two load cells 3 are attached to the rear side of the weighing hopper 2, as shown in FIGS. 1 and 4. The weighing hopper 2 is suspended from the four load cells 2 and retained.

The weighing hopper 2 includes a hopper body 201 having a tubular shape with a rectangular cross-section in a plan view, and first and second discharge gates 202, 203 which define the bottom portion of the hopper body 201 and are divided two parts of the bottom portion. The first and second discharge gates 202, 203 are fastened to first and second gate rotational shafts 204, 205, respectively, via suitable fastening means, and coupled to a rotary actuator 208 via link units 206, 207 using known toggle mechanisms, respectively. In this structure, the first and second discharge gates 202, 203 perform an opening/closing operation such that they are opened or closed together simultaneously.

The first to fourth load cells 3 are placed on load cell seats 33 provided above the weighing hopper 2, respectively. The load cell seats 33 are fastened to the frame member of the packet scale. The first to fourth suspending units 10 are mounted to the upper portion of the hopper body 201, in locations which are in the vicinity of the corner portions of the tubular shape. To this end, flange sections 21 are secured to the four corners of the upper portion of the hopper body 201, and the first to fourth suspending units 10 are mounted to the flange sections 21, respectively.

Although in the example of FIG. 1, the flange sections 21 are directly secured to the hopper body 201 for easier explanation, they may be secured to support plates 209 secured to the side of the hopper body 201 via support plate coupling members 210, respectively, as shown in FIGS. 2 and 3.

In this case, furthermore, the link units 206, 207 and the rotary actuator 208 are mounted to the support plates 209. Separating walls 211 are provided between the hopper body 201 and the support plates 209, and thereby the configuration (suspending units 10, load cells 3, etc.) which suspend and support the weighing hopper 2, and the configuration (rotary actuator 208, link units 206, 207, and fastening units for fastening the link units 206, 207 to the rotary shafts 204, 205) for activating cut gates 202, 203, can be separated from the hopper body 201 (flow passage of objects). This makes it possible to prevent the ingress of contaminations such as dust or lubricating oil into the objects held inside the hopper body 201, even when the contaminations are scattered according to the motion of the weighing hopper 2. In the conventional three-point support structure of the weighing hopper, it is necessary to provide the separating walls 211 for the three surfaces on which the suspending units are located, of the four surfaces of the hopper body defining the tubular shape with a rectangular cross-section. In contrast, in the present embodiment, since the weighing hopper 2 is supported at four points, the separating walls 211 may be provided for the two surfaces facing each other, of the four surfaces of the tubular shape of the hopper body 201. Therefore, in the present embodiment, it becomes possible to easily prevent the ingress of the contaminations into the hopper body 201 as compared to the conventional three-point structure.

Figure 5:
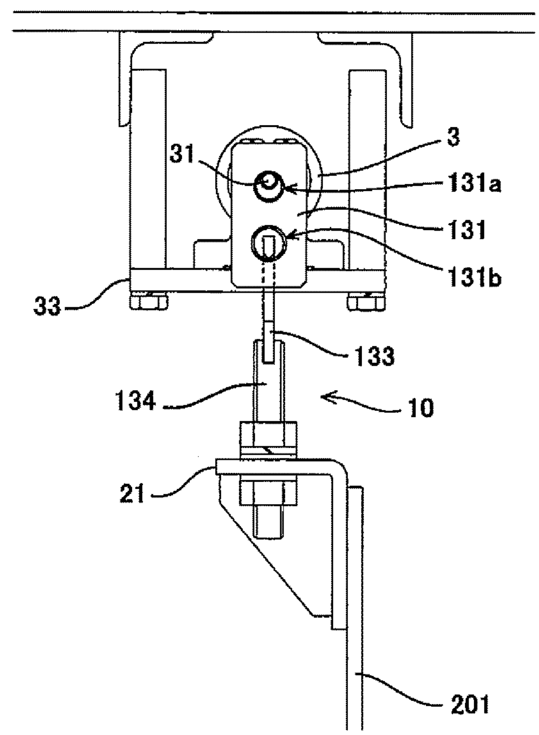
FIG. 5 is a front view showing the mounting state of a suspending unit in the packer scale of FIG. 2.
Figure 6:
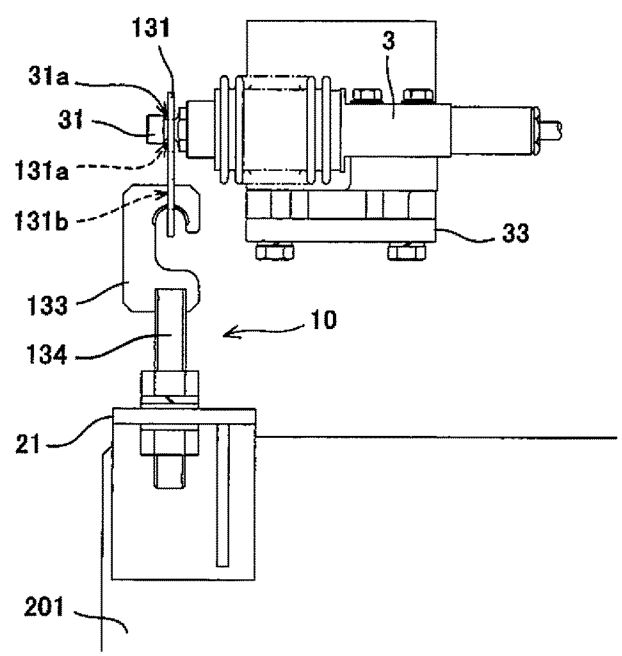
FIG. 6 is a side view showing the mounting state of the suspending unit in the packer scale of FIG. 2.

As shown in FIGS. 5 and 6, each of the suspending units 10 of the present embodiment includes a plate member 131 mounted to a load cell 3 and a hook member 133 having a hook shape, one end portion of which is fastened to the flange section 21 secured to the hopper body 201 and the other end portion of which is hooked in the plate member 131. The plate member 131 has a first hole 131*a* into which the load application section 31 of the load cell 3 is inserted, and a second hole 131*b* used to hook the hook member 133. To improve a weighing accuracy, the load application section 31 of the load cell 3 and the first hole 131*a* of the first plate member 131 are in point-contact with each other.

To this end, a section 31*a* of the load application section 31 of the load cell 3, which is engageable with the first hole 131*a*, has a smaller diameter than the other portion in the axial direction of the load application section 31 and is cut to be curved in the radial direction of the shaft of the load application section 31 when viewed from a direction perpendicular to the shaft of the load application section 31, and the first hole 131*a* has a shape in which its axial center portion has a smallest diameter. A rod member 134 is fastened to the lower end portion of the hook member 133. The lower end portion of the rod member 134 is threaded. The rod member 134 is fastened to the flange section 21 secured to the weighing hopper 2 by a fastening member 22 such as a bolt.

A throw-in chute 40 is provided above the weighing hopper 2 to supply the objects to the weighing hopper 2. The throw-in chute 40 includes a cylindrical hollow communication section 41 through which the objects pass vertically, and a cut gate 42 provided below the communication section 41 to throw the objects into the weighing hopper 2.

The cut gate 42 is rotatable around a rotary shaft 43 by a drive shaft 44 from a servo motor. According to the rotation of the cut gate 42 around the rotary shaft 43, an open state in which the objects are thrown into the weighing hopper 2 or a closed state in which the throw-in of the objects to the weighing hopper 2 is limited, is formed (in the example of FIG. 3, the closed state of the cut gate 42 is indicated by a solid line and the open state of the cut gate 42 is indicated by a two-dotted line).

The bottom surface of the cut gate 42 is curved to have a circular-arc shape, the center of which is the rotary shaft 43. The bottom surface has a hollow portion 45 in the center portion of one end portion of the rotary shaft 43 in its rotational direction. In this structure, by closing with the cut gate 42 the opening of the communication section 41 except the hollow portion 45, a small throw-in state (corresponding to the position of the cut gate 42 of FIG. 4) is formed, in which the throw-in amount of the objects to the weighing hopper 2 is lessened.

When the objects are thrown into the weighing hopper 2, initially, the cut gate 42 is open (fully open) for a specified period, and in this state, a large part (e.g., about 98%) of the objects of the target weight, which is measured by the weighing hopper 2, is thrown into the weighing hopper 2 (large throw-in state). Then, the position of the cute gate 42 is changed into the small throw-in state for a specified period, based on the weight of the objects which is detected the first to fourth load cells 3 so that the weight of the objects thrown into the weighing hopper 2 coincides with the target weight.

In the small throw-in state, the objects are thrown into the weighing hopper 2 in a location which is deviated from the center portion of the communication section 41 of the throw-in chute 40. In the present embodiment, the center position of the communication section 41 of the throw-in chute 40 is offset with respect to the center position of the hopper body 201 of the weighing hopper 2 so that the location to which the objects are thrown into the weighing hopper 2 in the small throw-in state is as close to the center position of the hopper body 201 of the weighing hopper 2 as possible. However, if the location to which the objects are thrown into the weighing hopper 2 in the small throw-in state coincides with the center position of the hopper body 201 of the weighing hopper 2, then an uneven load is generated in the large throw-in state (fully open state of the cut gate 42). To avoid this, the throw-in chute 40 and the weighing hopper 2 are placed such that the center position of the hopper body 201 of the weighing hopper 2 is located between the center position of the communication section 41 of the throw-in chute 40, and the location to which the objects are thrown into the weighing hopper 2 in the small throw-in state.

Therefore, the objects thrown from the throw-in chute 40 using one cut gate 42 into the weighing hopper 2 like the present embodiment, may cause an uneven load in the weighing hopper 2, in some cases. In this case, in the conventional three-point structure, as described above, it is more likely that the objects are thrown into the region which is outside the triangular shape formed by three points, and the balance of the weighing hopper 2 tends to be lost. In contrast, in the four-point support structure of the present embodiment, even when the objects thrown into the weighing hopper become uneven, the balance is less likely to be lost and high stability can be maintained.

As described above, in accordance with the above configuration, even when the objects thrown into the weighing hopper 2 become uneven, the balance is less likely to be lost and the weighing can be performed stably and in a shorter time, by employing the four-point support structure in the weighing hopper 2. In addition, since such a weighing device can be configured without changing the distance (height of center of gravity) from the positions (height position of load application sections 31) at which the suspending unit 1 are attached to the weighing hopper 2 to the center of gravity of the weighing hopper 2, flexibility of design is not reduced.

The present invention is applicable to a throw-in chute (double gate type) including two cut gates, instead of the throw-in chute 40 (single gate type) including one cut gate 42. In a case where a hollow portion for the small throw-in state is provided in the double gate type, the hollow portion is provided at the center portion of the tip end of at least one of the cut gates of the double gate type. In the throw-in chute of the double gate type, the objects can be thrown into a relatively center portion of the weighing hopper in the small throw-in state. However, due to the frictional force of the inner wall of the communication section of the throw-in chute, or a difference in physical structure between the two cut gates of the double gate type, the objects thrown into the weighing hopper 2 become uneven in some cases. Therefore, the above stated advantages of the present invention can be achieved in such a throw-in chute. Or, a cut gate having a structure with no hollow portion may be used, irrespective of the single gate type or the double gate type.

Embodiment 2

Figure 7:
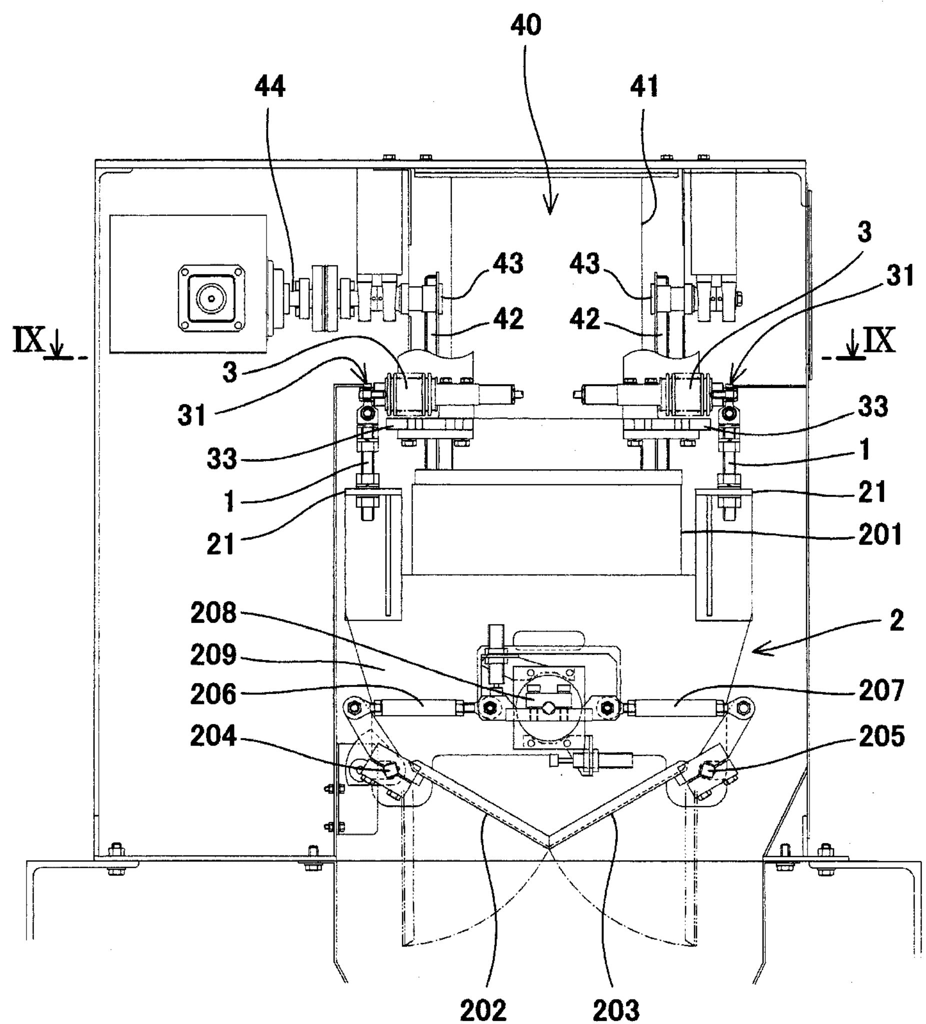
FIG. 7 is a front view showing a packer scale according to Embodiment 2 of the present invention.
Figure 8:
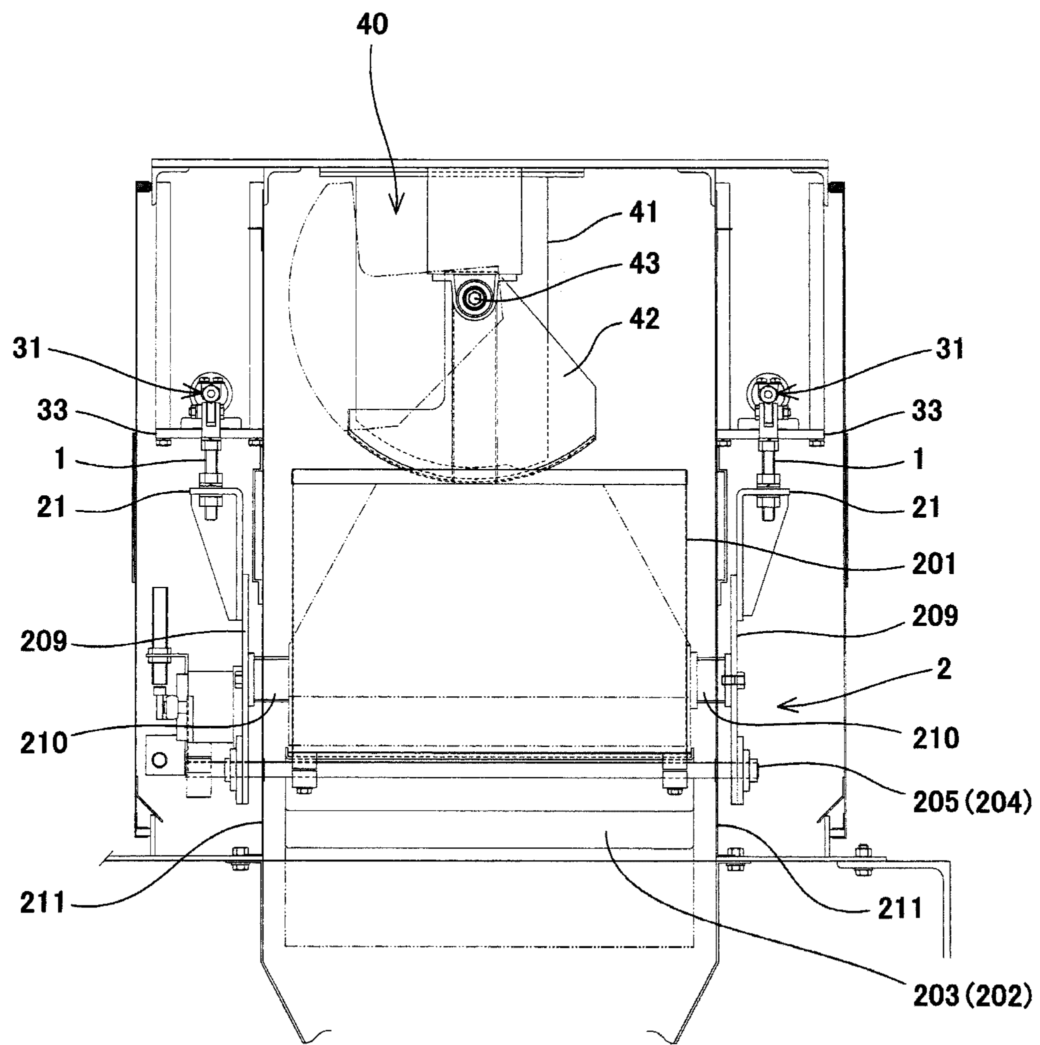
FIG. 8 is a side view of the packer scale of FIG. 7.
Figure 9:
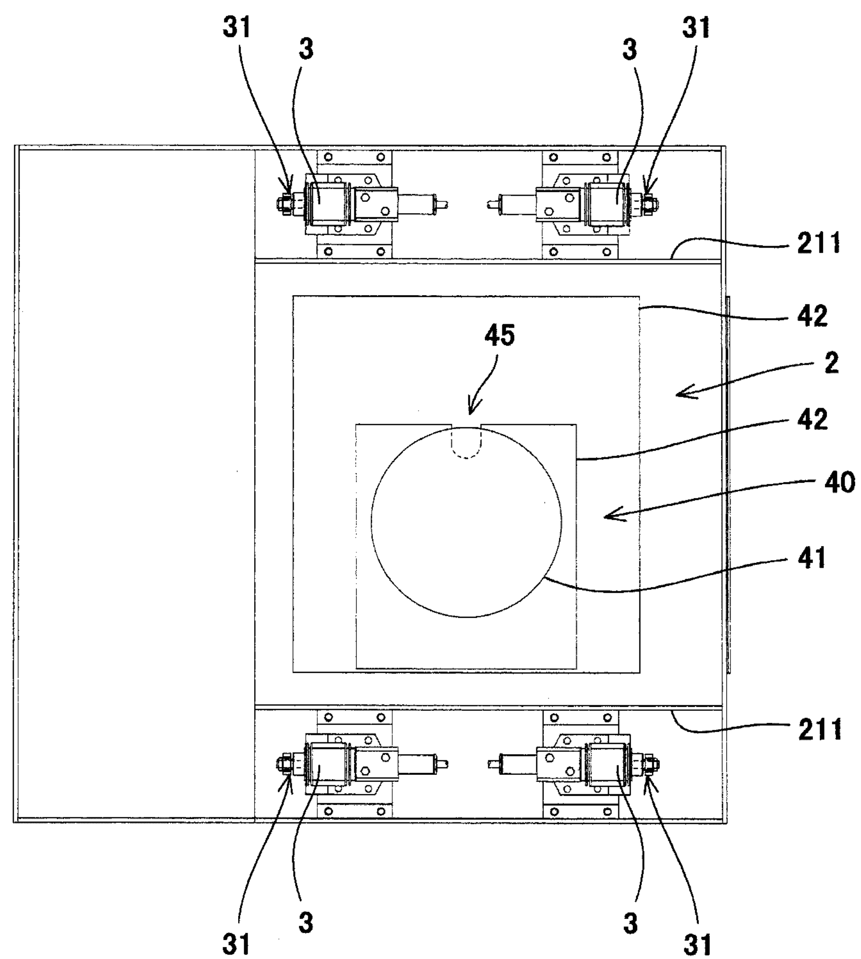
FIG. 9 is a top view (cross-sectional view taken in the direction of arrows along IX-IX of FIG. 7) of the packer scale of FIG. 7.

Next, the packer scale of Embodiment 2 will be described with reference to FIGS. 7 to 9. In Embodiment 2, the same components as those of Embodiment 1 are designated by the same reference symbols and will not be described repeatedly. The packer scale of the present embodiment is different from the suspending unit 10 of Embodiment 1, in the structure of the suspending unit 1 which suspends and supports the weighing hopper 2.

Figure 10:
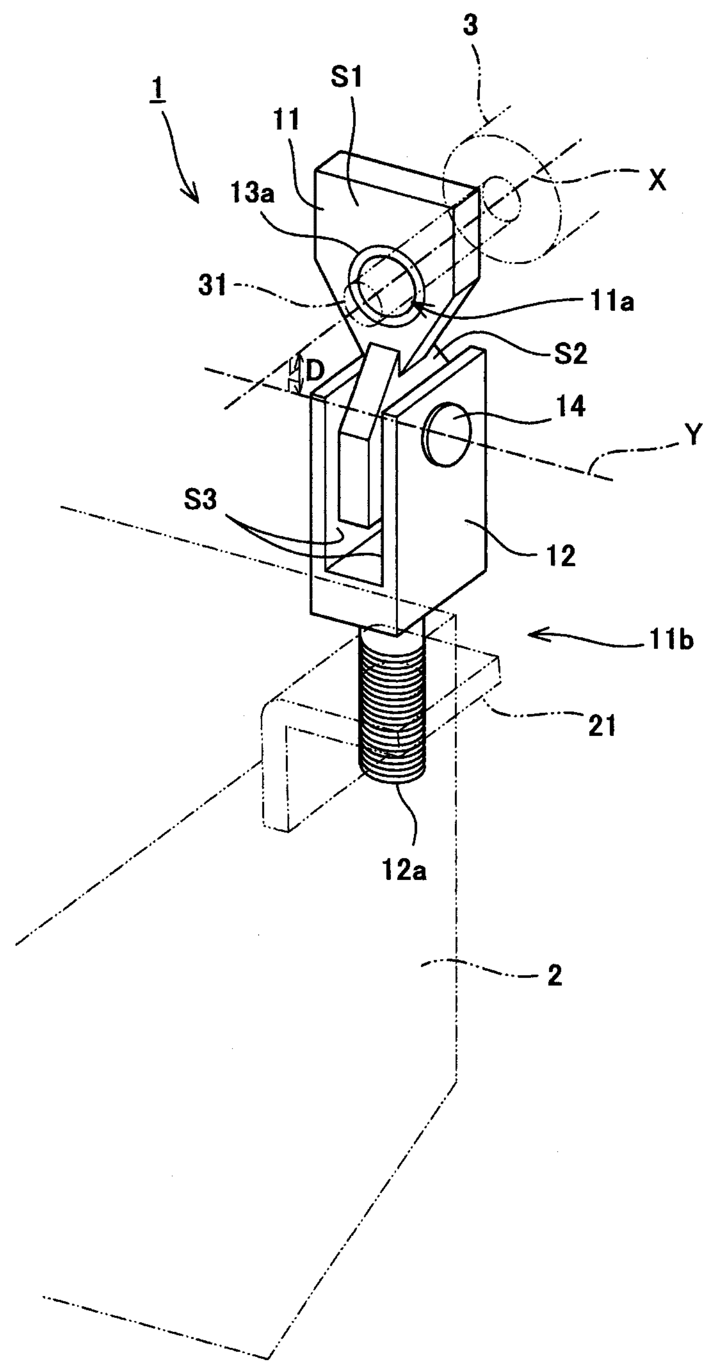
FIG. 10 is a view showing the structure of the suspending unit in the packer scale of FIG. 7.
Figure 11:
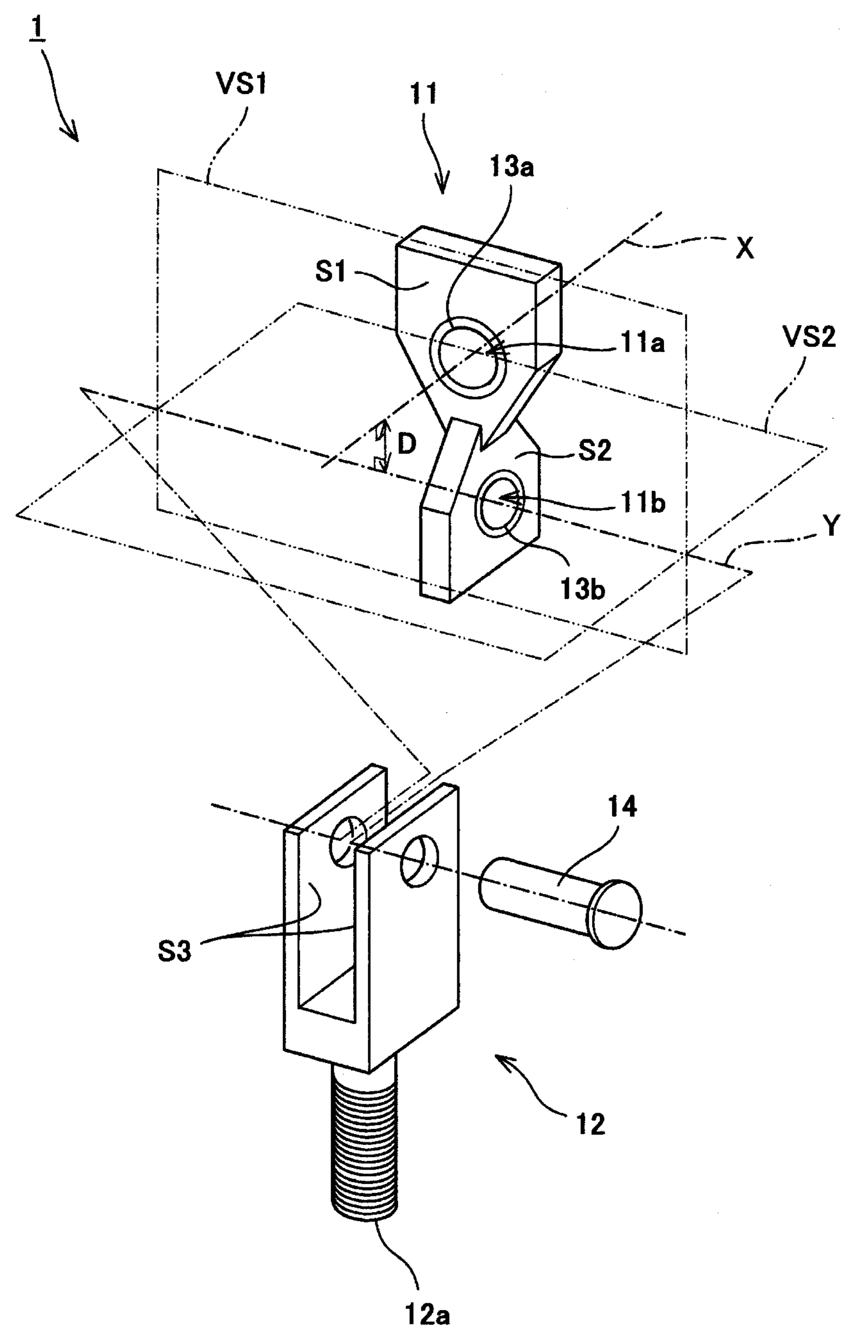
FIG. 11 is an exploded perspective view showing the suspending unit in the packer scale of FIG. 7.

The structure of the suspending unit 10 will be described with reference to FIGS. 10 to 13. As shown in FIGS. 10 and 11, a suspending unit 1 of the present embodiment includes a first member 11 and a second member 12.

The first member 11 has a first hole 11*a* extending in a predetermined first axis X direction and a second hole 11*b* extending in a second axis Y direction which three-dimensionally crosses the first axis X. In the present embodiment, the second axis Y is an axis included in both of a first virtual plane VS1 perpendicular to the first axis X and a second virtual plane VS2 parallel to the first axis X. In other words, when viewed from above in a state in which the suspending unit 1 is mounted to the weighing device, the first axis X (first hole 11*a*) and the second axis Y (second hole 11*b*) are orthogonal to each other. Alternatively, the first axis X and the second axis Y need not be always orthogonal to each other so long as the weighing hopper 2 is three-dimensionally pivotable, in a state in which the weighing hopper 2 is mounted to the weighing device by means of the suspending unit 1.

In the present embodiment, the first member 11 is positioned such that the first hole 11*a* and the second hole 11*b* overlap with each other when viewed from above. The first member 11 has a first surface S1 perpendicular to the first axis X and a second surface S2 perpendicular to the second axis Y. In other words, in the present embodiment, the first member 11 has a shape in which two plate sections are combined to be perpendicular to each other, and the plate sections have the first hole 11*a* and the second hole 11*b*, respectively. It should be noted that the first member 11 may be formed by casting or by combining two plate members. In addition, a first ball bearing 13*a* is fitted to the first hole 11*a* of the first member 11 and a second ball bearing 13*b* is fitted to the second hole 11*b* of the first member 11.

The second member 12 has at one end portion thereof, a mounting surface S3 parallel to the second surface S2 of the first member 11. A rotary shaft 14 is mounted to the mounting surface S3 such that the rotary shaft 14 extends in a direction perpendicular to the mounting surface S3. The second member 12 is mounted to the first member 11 via the second ball bearing 13*b* fitted to the second hole 11*b* of the first member 11 such that the second member 12 is rotatable relative to the first member 11. Specifically, by inserting the rotary shaft 14 of the second member 12 into the second ball bearing 13*b*, the second member 12 is rotatable around the rotary shaft 14 relative to the first member 11. The inner diameter of the second ball bearing 13*b* is determined to conform to the shaft diameter of the rotary shaft 14 of the second member 12 (the rotary shaft 14 can be inserted into the second ball bearing 13*b* and a slack between the rotary shaft 14 and the second ball bearing 13*b* in a radial direction is smallest). Since the first member 11 has the second surface S2 perpendicular to the second axis Y, the mounting surface by which the second member 12 is mounted to the first member 11 is a flat surface. As a result, space saving can be achieved, and the second member 12 is easily rotatable (pivotable) relative to the first member 11. Furthermore, since the second member 12 has the mounting surface S3 parallel to the second surface S2 and the rotary shaft 14 is mounted to the mounting surface S3 such that the rotary shaft 14 extends in the direction perpendicular to the mounting surface S3, the second member 12 can be easily mounted to the first member 11, while achieving space saving.

In the present embodiment, the mounting surface S3 of the second member 12 extends from a base end portion to which a weighing hopper mounting section 12*a* is fastened, toward both sides of the first member 11 in the second axis Y direction (mounting surface S3 has a substantially-U shape). However, the present invention is not limited to this so long as the second member 12 is mounted to the first member 11 such that the second member 12 is rotatable (pivotable) relative to the first member 11. For example, the mounting surface S3 may be provided only at one side of the first member 11 in the second axis Y direction, and a restricting member (e.g., bolt) for preventing disengagement of the rotary shaft 14 may be fastened to the rotary shaft 14 at the other side of the first member 11 in the second axis Y direction.

Figure 12:
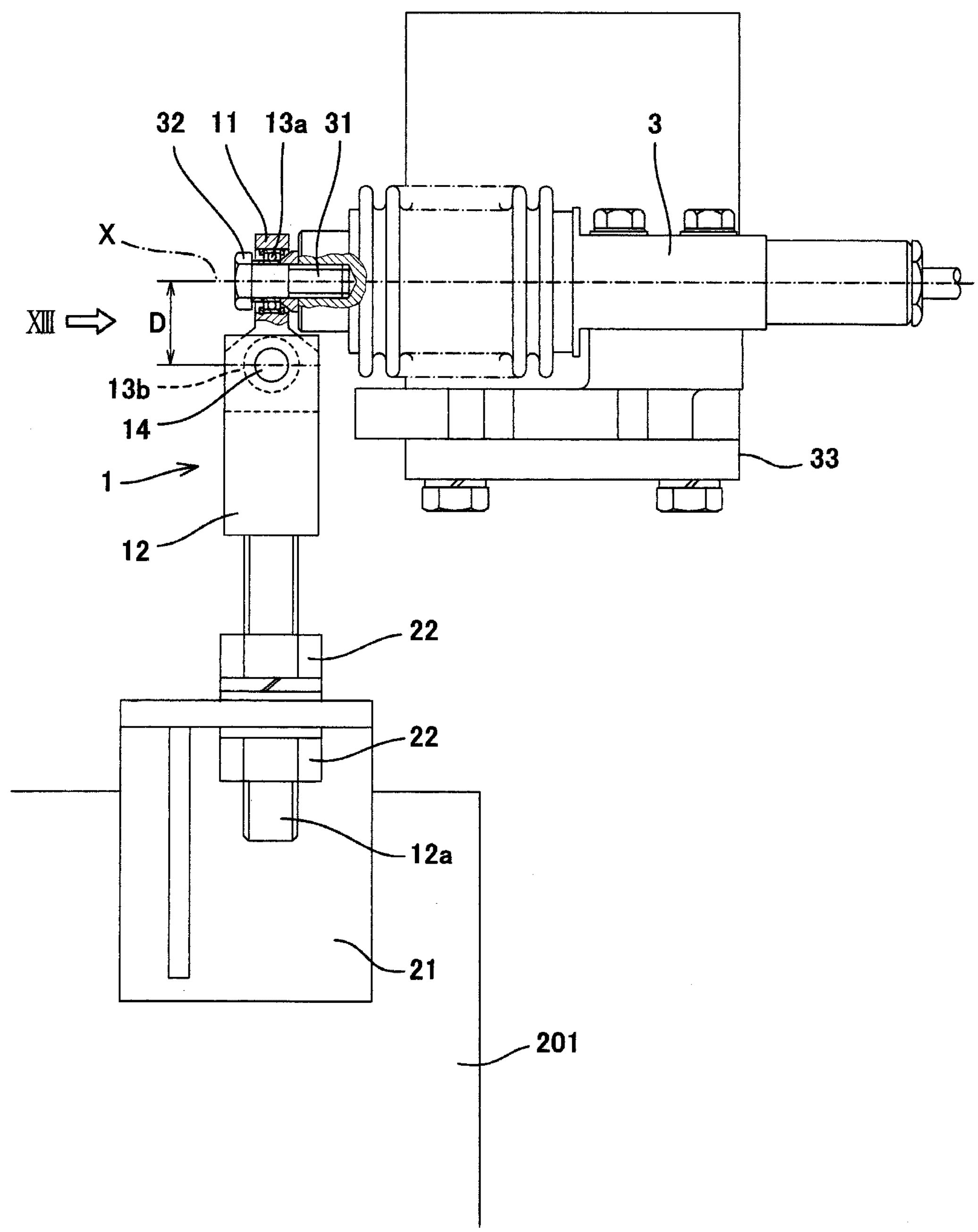
FIG. 12 is a front view showing the mounting state of the suspending unit in the packer scale of FIG. 7.
Figure 13:
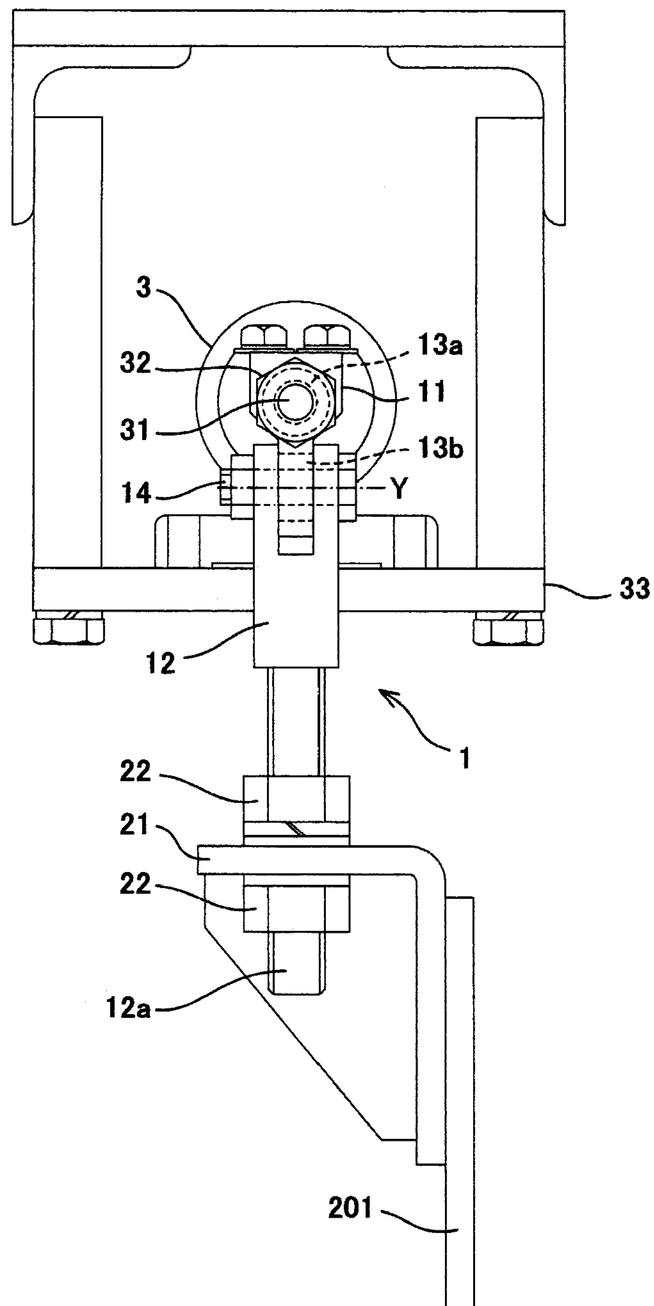
FIG. 13 is a side view of the suspending unit of FIG. 12 (in the direction of XIII of FIG. 12).

As shown in FIGS. 12 and 13, the other end portion of the second member 12 is provided with the weighing hopper mounting section 12*a* used to fasten the hopper body 201 of the weighing hopper (scale hopper) 2. The weighing hopper mounting section 12*a* has a threaded portion. The weighing hopper mounting section 12*a* is fastened to the flange section 21 secured to the hopper body 201 of the weighing hopper 2 using a fastening member 22 such as a bolt.

The first member 11 is mounted to a shaft-like load application section 31 of the load cell 3 via the first ball bearing 13*a* fitted to the first hole 11*a* such that the first member 11 is rotatable relative to the load application section 31. The inner diameter of the first ball bearing 13*a* is determined to conform to the shaft diameter of the load application section 31 of the load cell 3 (the first ball bearing 13*a* and the first member 11 are slidable in the first axis X direction relative to the load application section 31 of the load cell 3 and a slack between the first ball bearing 13*a* and the load application section 31, in the radial direction, is smallest). The load cell 3 is fastened to a weighing device body (not shown) in a state in which the shaft of the load application section 31 is oriented horizontally. In other words, the first axis X is oriented horizontally in a state in which the suspending unit 1 is mounted to the load cell 3. The load application section 31 has a threaded tip end portion. When the suspending unit 1 is mounted to the load cell 3, the motion of the first member 11 in the first axis X direction is restricted by a restricting member 32 (see FIG. 12) such as a bolt. As described above, since the first member 11 has the first surface S1 perpendicular to the first axis X, the mounting surface by which the first member 11 is mounted to the load cell 3 is a flat surface. As a result, space saving can be achieved and the first member 11 is easily rotatable relative to the load cell 3.

By mounting the first member 11 to the load application section 31 of the load cell 3 and fastening the weighing hopper 2 to the second member 12, in the above described manner, the weighing hopper 2 is suspended from the load cell 3 via the suspending unit 1. More specifically, one weighing hopper 2 is provided with four flange sections 21 at four corners thereof, and is suspended from four load cells 3 using the four suspending units 1 in such a manner that the suspending units 1 are fastened between the four load cells 3 and the four flange sections 21, respectively The packer scale is required to weigh the objects with a heavy weight which is as large as, for example, several tens kg, which is charged into each bag. Correspondingly, in many cases, the weighing hopper itself has a heavy weight to ensure the large size or stiffness of the weighing hopper. For example, in some cases, the weight of the weighing hopper is equal to or more than 50 kg.

However, if the flexibility between the load cell and the weighing hopper is less, like the structure disclosed in Patent Literature 1, an impact generated by throwing the objects into the weighing hopper, affects weighing, and thereby a weighing accuracy degrades. In contrast, in the suspending unit 10 of Embodiment 1 has a flexible structure, because the hook member 133, the plate member 131, and the load cell 3 are not fastened to each other. Therefore, the impact generated by throwing the objects into the weighing hopper, is mitigated to some extent. A considerably great impact load, which is added with the weight of the weighing hopper, is applied to the suspending unit when the objects with a heavy weight are thrown into the weighing hopper. For example, in a case where the objects of about 25 kg are thrown into the weighing hopper, the impact load applied to the suspending unit may be about 150 kg in some cases. When such a great load impact is applied to the suspending unit 10 of Embodiment 1, the hook member 133 and the weighing hopper 132 may move upward as if they jump relative to the plate member 131 in some cases. When the hook member 133 jumps upward relative to the plate member 131, an engagement position (force application point) between the plate member 131 and the load cell 3 is axially deviated and thereby a zero point in the weighing is deviated, which makes it impossible to carry out correct weighing. When the hook member 133 jumps upward relative to the plate member 131 due to the great impact load, a fluctuation of the weighing hopper 132 is increased, and wait time (weighing stabilization time) required to achieve a predetermined weighing accuracy after the objects are thrown into the weighing hopper becomes long. This impedes achievement of higher-speed weighing.

In view of the above, the suspending unit 1 of the present embodiment may be applied to perform weighing with a high weighing accuracy and in a shorter time, even when the weight (target weight) of the objects thrown into the weighing hopper 2 is relatively large.

In accordance with the suspending unit 1 of the present embodiment, the first member 11 of the suspending unit 1 is mounted to the load application section 31 of the load cell 3 via the first ball bearing 13*a* such that the first member 11 is rotatable relative to the load application section 31 around the shaft (around the first axis X) of the load application section 31. In addition, the second member 12 fastened to the weighing hopper 2 is mounted to the first member 11 via the second ball bearing 13*b* such that the second member 12 is rotatable relative to the first member 11 around the second axis Y included in both of the first virtual plane VS1 perpendicular to the first axis X and the second virtual plane VS2 parallel to the first axis X (the second axis Y three-dimensionally crossing the first axis X).

In this structure, when the objects are thrown into the weighing hopper 2, the first member 11 is pivoted around the axis X and the second member 12 is pivoted around the axis Y such that the impact is absorbed, thereby allowing the weighing hopper 2 to be displaced horizontally and vertically. In addition, this pivot motion caused by the impact is diminished quickly by the weight of the weighing hopper 2 and the weight of the objects, and the ball bearing 13*a* with a low friction and the ball bearing 13*b* with a low friction allow the first member 11 and the second member 12 to quickly return to positions, respectively (positions before the objects are thrown into the weighing hopper 2) at which the weighing hopper 2 is in a lowest position. Furthermore, because of the absence of the hook member of Embodiment 1, the jump motion of the weighing hopper 2 and the second member 12, relative to the load cell 3 and the first member 11, due to the impact generated when the objects are thrown into the weighing hopper 2, will not occur, and the first member 11 mounted to the load application section 31 of the load cell 3 is not displaced from a proper position. This allows the impact applied to the weighing hopper 2 to be efficiently released and the weighing hopper 2 to be stabilized in a shorter time. As a result, weighing can be carried out with a higher weighing accuracy and in a shorter time. In the conventional weighing device, a fluctuation preventing mechanism or a clamping device is typically provided to diminish the pivot motion of the weighing hopper 2, which occurs when the objects are thrown into the weighing hopper 2. In contrast, in accordance with the configuration of the present embodiment, the amount of the pivot motion can be reduced. This can eliminate a need for a member for diminishing the pivot motion of the weighing hopper 2, and hence the weighing device is allowed to have a simplified structure.

Preferably, the center-to-center distance D between the first ball bearing 13*a* and the second ball bearing 13*b* is set so that the first ball bearing 13*a* and the second ball bearing 13*b* are as close to each other as possible. Specifically, the center-to-center distance D is preferably set greater than a sum of the radius (radius of outer circle) R1 of the first ball bearing 13*a* and the radius (radius of outer circle) R2 of the second ball bearing 13*b* and equal to or less than 1.5 times as large as the sum ($R1+R2<D\leq 1.5(R1+R2)$). This makes it possible to reduce the amount of the pivot motion of the first member 11 due to the impact and stabilize the weighing hopper in a shorter time.

In the present embodiment, as the first ball bearing 13*a* and the second ball bearing 13*b*, the same ball bearings (radius R) may be used. In this case, the center-to-center distance D between the two ball bearings 13*a*, 13*b* is preferably set as $2R<D\leq 3R$.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

A packer scale of the present invention is useful in performing weighing stably and in a shorter time, while lessening to a minimum level the effects of the unevenness of the objects thrown into the weighing hopper and the height of center of gravity of the objects held inside the weighing hopper.

REFERENCE SIGNS LIST

1, 10 suspending unit
2 weighing hopper
3 load cell
11 first member
11*a* first hole
11*b* second hole
12 second member
12*a* weighing hopper mounting section
13*a* first ball bearing
13*b* second ball bearing
14 rotary shaft
21 flange section
22 fastening member
31 load application section
32 restricting member

The invention claimed is:

1. A packer scale for charging objects with a predetermined weight into each bag, the packer scale comprising:

a weighing hopper which is supplied with the objects dropped from above, holds the objects for a specified period and discharges the objects downward;

first to fourth load cells having shaft-like load application sections, respectively; and first to fourth suspending units which suspend the weighing hopper such that the weighing hopper is mounted to the load application sections of the first to fourth load cells;

wherein the weighing hopper includes a hopper body having a tubular shape with a rectangular cross-section, in a plan view; and wherein the first to fourth suspending units are mounted to an upper portion of the hopper body, in locations which are in the vicinity of corner portions of the tubular shape;

wherein each of the suspending units includes:

a first member mounted to the load application section of the load cell; and a second member fastened to the weighing hopper;

wherein the first member has a first hole extending in a predetermined first axis direction and a second hole extending in a second axis direction which three-dimensionally crosses the first axis;

wherein the first member is mounted to the load application section of the load cell via a first ball bearing fitted to the first hole such that the first member is rotatable relative to the load application section; and wherein the second member is mounted to the first member via a second ball bearing fitted to the second hole of the first member such that the second member is rotatable relative to the first member.

2. The packer scale according to claim 1, wherein the second axis is an axis included in both of a first virtual plane perpendicular to the first axis and a second virtual plane parallel to the first axis.

3. The packer scale according to claim 1, wherein a center-to-center distance between the first ball bearing and the second ball bearing is set greater than a sum of a radius of the first ball bearing and a radius of the second ball bearing and equal to or less than 1.5 times as large as the sum.

4. The packer scale according to claim 1, wherein the first member has a first surface perpendicular to the first axis and a second surface perpendicular to the second axis.

5. The packer scale according to claim 4, wherein the second member includes:

a mounting surface parallel to the second surface; and a rotary shaft mounted to the mounting surface such that the rotary shaft extends in a direction perpendicular to the mounting surface.

6. The packer scale according to claim 2, wherein a center-to-center distance between the first ball bearing and the second ball bearing is set greater than a sum of a radius of the first ball bearing and a radius of the second ball bearing and equal to or less than 1.5 times as large as the sum.

7. The packer scale according to claim 2, wherein the first member has a first surface perpendicular to the first axis and a second surface perpendicular to the second axis.

8. The packer scale according to claim 3, wherein the first member has a first surface perpendicular to the first axis and a second surface perpendicular to the second axis.

9. The packer scale according to claim 6, wherein the first member has a first surface perpendicular to the first axis and a second surface perpendicular to the second axis.

10. The packer scale according to claim 7, wherein the second member includes:

a mounting surface parallel to the second surface; and a rotary shaft mounted to the mounting surface such that the rotary shaft extends in a direction perpendicular to the mounting surface.

11. The packer scale according to claim 8, wherein the second member includes:

a mounting surface parallel to the second surface; and a rotary shaft mounted to the mounting surface such that the rotary shaft extends in a direction perpendicular to the mounting surface.

12. The packer scale according to claim 9, wherein the second member includes:

a mounting surface parallel to the second surface; and a rotary shaft mounted to the mounting surface such that the rotary shaft extends in a direction perpendicular to the mounting surface.

* * * * *